Figure 1:
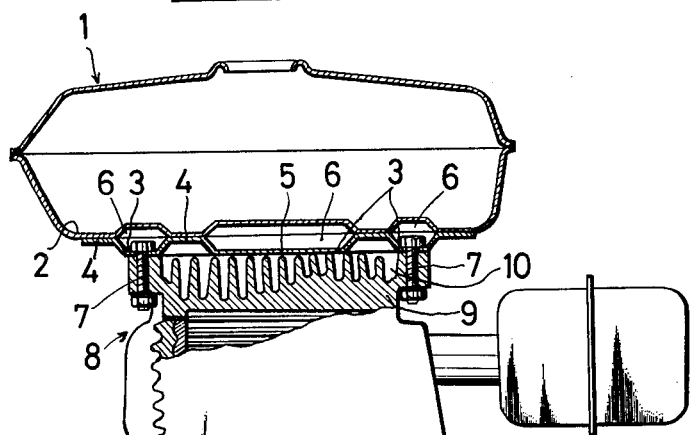

United States Patent [19]

Ogano et al.

[11] 4,069,804
[45] Jan. 24, 1978

[54] APPARATUS FOR ATTACHING A FUEL TANK IN AN INTERNAL COMBUSTION ENGINE

[75] Inventors: Takeo Ogano, Kawagoe; Mitsuru Noguchi, Saitama, both of Japan

[73] Assignee: Honda Giken Kogyo Kabushiki Kaisha, Tokyo, Japan

[21] Appl. No.: 699,965

[22] Filed: June 25, 1976

[30] Foreign Application Priority Data

June 30, 1975 Japan ............................ 50-90749[U]

[51] Int. Cl.² ...................... F02M 59/00; F28F 13/00
[52] U.S. Cl. ................................ 123/198 E; 123/136; 165/135; 220/68; 220/86 R
[58] Field of Search ............... 220/68 R, 86 R, 85 R; 123/41.31, 195 A, 198 R, 198 E, 136; 165/135

[56] References Cited

U.S. PATENT DOCUMENTS

| 779,740 | 1/1905 | Schenck | 220/86 R |
|---|---|---|---|
| 859,615 | 7/1907 | Phillips | 220/68 R |
| 1,384,512 | 7/1921 | Buchi | 123/136 |
| 2,119,009 | 5/1938 | Elias | 165/135 |
| 2,151,535 | 3/1939 | Scurlock | 220/68 R |
| 2,180,185 | 11/1939 | Weiss | 220/86 R |
| 3,126,718 | 3/1964 | Flamand | 165/135 |
| 3,126,918 | 3/1964 | Eaton | 165/135 |
| 3,282,011 | 11/1966 | Meserole | 165/135 |
| 3,521,726 | 7/1970 | Freyn | 123/198 E |
| 3,684,053 | 8/1972 | Fachbach | 123/198 E |

*Primary Examiner*—Charles J. Myhre
*Assistant Examiner*—Daniel J. O'Connor

[57] ABSTRACT

Apparatus for attaching a fuel tank in an internal combustion engine, the apparatus comprising a wave-like seat plate including an assembly with alternately curved concavities and convexities therein, applied with said concavities to a lower surface of a bottom plate of the fuel tank so as to form adiabatic spaces above the concavities, and between the seat plate and the bottom plate, the assembly being secured with the seat plate to an upper surface of the engine body. Optionally, this body may have plural projecting fins, forming air passages into which cooling air may be led, for example from a fan.

3 Claims, 2 Drawing Figures

APPARATUS FOR ATTACHING A FUEL TANK IN AN INTERNAL COMBUSTION ENGINE

This invention relates to an apparatus for attaching a fuel tank to an upper surface of an internal combustion engine body, mainly for engines used for general purposes.

It has been usual hitherto with this kind of apparatus that the fuel tank is attached to the upper surface of the engine body through stays. In this case, for protecting as much as possible the fuel tank from radiating heat emitted by the engine body, it is required to project the stays at a comparative length and to interpose an adiabatic cover between the two. Accordingly, disadvantages are involved in that the construction becomes complicated as a whole and lacks rigidity.

This invention has for its object to provide an apparatus that is free from the foregoing disadvantages.

According to important features of the invention, an apparatus is provided for attaching a fuel tank in an internal combustion engine that has a body, the fuel tank having a bottom plate, wherein the apparatus comprises wave-like seat plate including an assembly with alternately curved concavities and convexities therein, applied with the convexities to a lower surface of the fuel-tank bottom plate, so as to form adiabatic spaces above the concavities, and between the seat plate and the bottom plate, the assembly being secured with the seat plate to an upper surface of the engine body.

According to further, optional features the bottom plate may be curved in a wave-like form that is similar to the form of the seat plate.

The upper surface of the engine body may have plural projecting fins that extend in frontal and rearward directions, and parallel one with another, so as to form air passages between adjacent pairs of the fins, the passages also extending in frontal and rearward directions, so arranged that cooling air may be led into the passages, e.g. from a fan through a cover provided above the latter.

Figure 2:
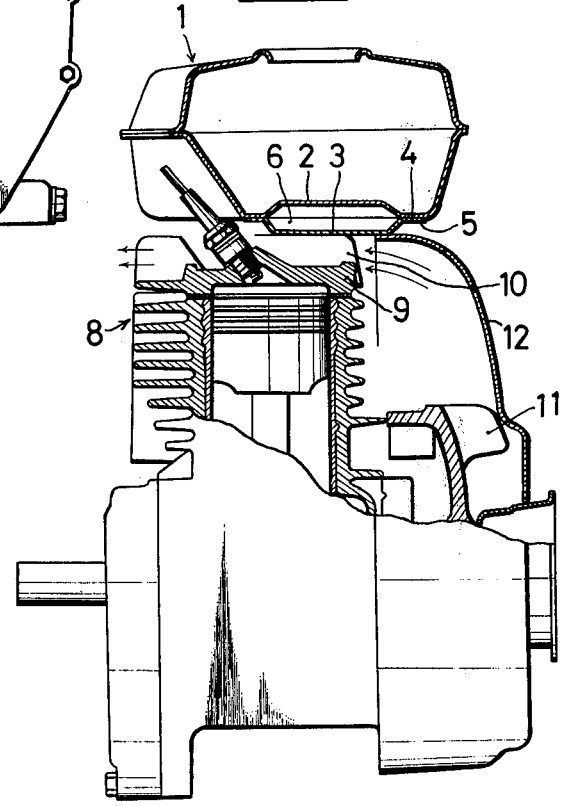

Further objects, features and advantages of the invention will be better understood from the detailed description that follows with reference to the accompanying drawing wherein:

FIG. 1 is a sectional front view of an exemplary embodiment of the inventive apparatus for attaching a fuel tank in an internal combustion engine; and FIG. 2 is a sectional side view of the same.

In the apparatus, a wave-like seat plate 5 has alternately curved concavities 3 and convexities 4, placed at the convexities on and secured to a lower surface of a bottom plate 2 of a fuel tank 1 of the engine. Consequently, adiabatic spaces 6 are formed above the concavities 3 and between the seat plate 5 and the bottom plate 2, the assembly being secured at the seat plate 5 to an upper surface of the internal combustion engine body 8, for example by bolts 7.

In the illustrated exemplary embodiment, the concavities 3 of the seat plate 5 include a dish-shaped concave area at the middle portion thereof, and groove-shaped concavities at the opposite outside portions. Additionally, the bottom plate 2 is formed to have concavities corresponding thereto so that each of the spaces 6 formed therebetween may become comparative large in height. The seat plate 5 is applied, at the concavities 3 located at the opposite outside portions thereof, with respective bolts 7 that connect the same to the engine body 8. It will be understood that other means can be used instead of the bolts. The resultant convexities of the bottom plate 5 are placed on the corresponding convexities of the seat plate 2 and are secured thereto integrally by means of an adhesive agent or the like.

Additionally, the engine body 8 may be provided on its upper surface with plural fins 9 that extend in frontal and rearward directions and in parallel with one another so as to form an air passage 10 between each adjacent pair of fins, extending in frontal and rearward directions, and it is so arranged that cooling air may be led thereinto from a fan 11 or the like, preferably located on the rear and lower side thereof, through a fan cover 12 provided above the fan.

According to the invention, the seat plate 5 is placed on and secured to the lower surface of the bottom plate 2 of the fuel tank 1 so as to form the adiabatic spaces 6 between the two plates 2, 5. This assembly secured at the seat plate 5 to the engine body 8, e.g. by the bolts 7, so that the seat plate 5 can serve both as the earlier-mentioned conventional stays and adiabatic cover, so that the construction of the inventive apparatus becomes comparatively simple as a whole, increases in rigidity, and furthermore the plate members to be used can be comparatively thin while maintaining their strength.

Additionally, the bottom plate 2 can be formed to have a wave-like form similar to that of the seat plate 5. The spaces are then increased in height, and as a result the adiabatic effect is improved. The fuel tank 1 is further increased in strength by the provision of this optional feature.

Furthermore, the engine body 8 can be provided on its upper surface with projecting fins 9, as explained earlier, namely in frontal and rearward directions and in parallel with one another. The air passages 10 are thus formed between the respective fins 9, with the provision of the fin 11 and the cover 12, preferably in the rear thereof, affording excellent air cooling for the fuel tank and the engine body 8.

It will be understood by those skilled in the art that several modifications, additions and changes can be made in the inventive apparatus without departing from the spirit and scope of the invention.

What we claim is:

1. An apparatus for attaching a fuel tank to an internal combustion engine, said engine being provided with a body, said fuel tank having a bottom plate, the apparatus comprising a wave-like seat plate including an assembly with alternately curved concavities and convexities therein, said seat plate being applied at said convexities on the opposite outside portions thereof to a lower surface of said bottom plate of the fuel tank and positioned by fastening means having respective head portions disposed in respective concavities, for attachment to said engine body; spaces formed above said concavities and between said seat plate and said bottom plate defining adiabatic spaces, said assembly being secured with said set plate to an upper surface of said engine body.

2. The apparatus as defined in claim 1, wherein said bottom plate is curved in a wave-like form that is similar to the wave-like form of said seat plate.

3. The apparatus as defined in claim 1, wherein said upper surface of the engine body has plural projecting fins extending in frontal and rearward directions, and parallel one with another, so as to form air passages between adjacent pairs of said fins, said passages also extending in frontal and rearward directions, so arranged that cooling air may be led into said passages from a fan through a cover provided above the latter.

* * * * *